Dec. 14, 1937.                T. ZUSCHLAG                2,102,450
                           MAGNETIC ANALYSIS
                          Filed Nov. 1, 1933         2 Sheets-Sheet 1
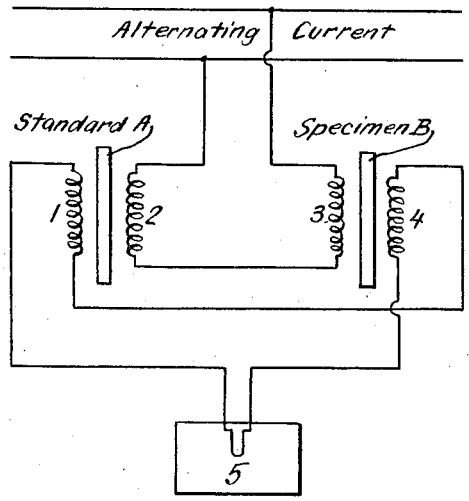
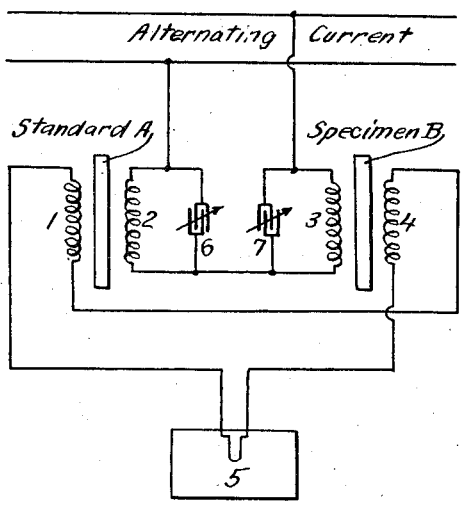
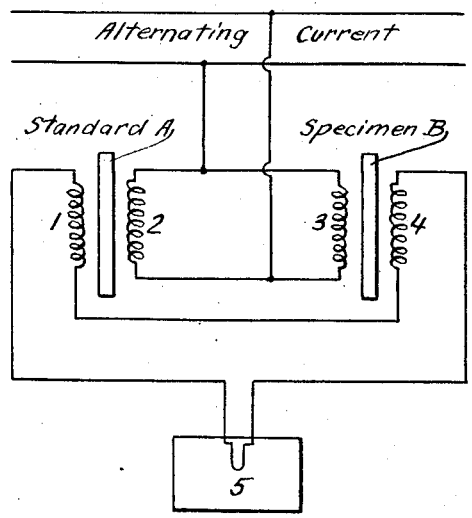
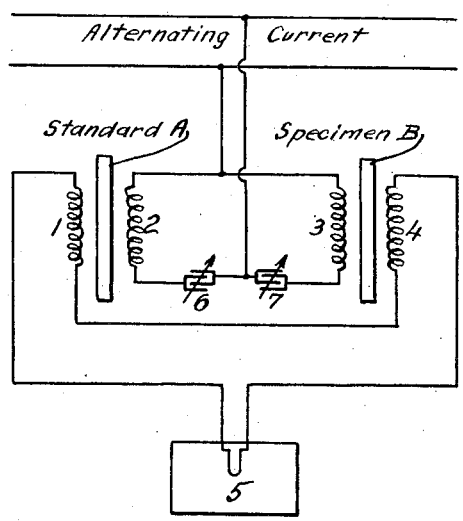
Theodor Zuschlag
INVENTOR
BY
ATTORNEYS Dec. 14, 1937.  T. ZUSCHLAG  2,102,450
MAGNETIC ANALYSIS
Filed Nov. 1, 1933  2 Sheets-Sheet 2
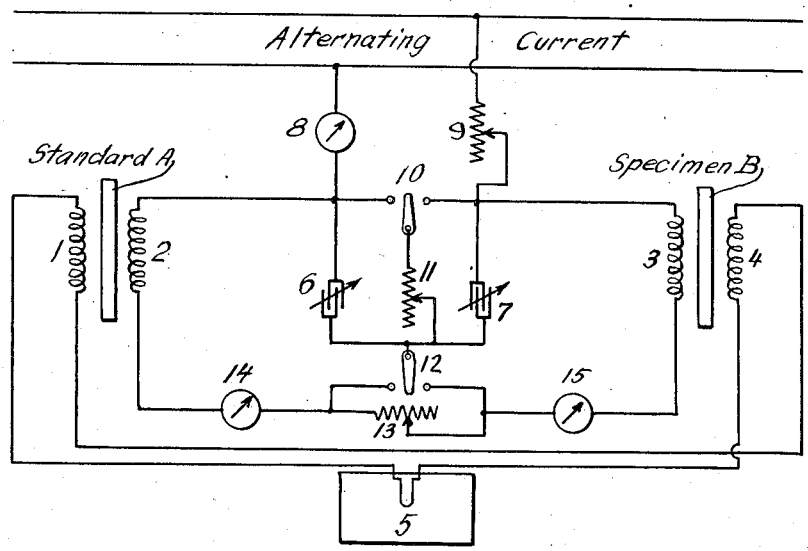
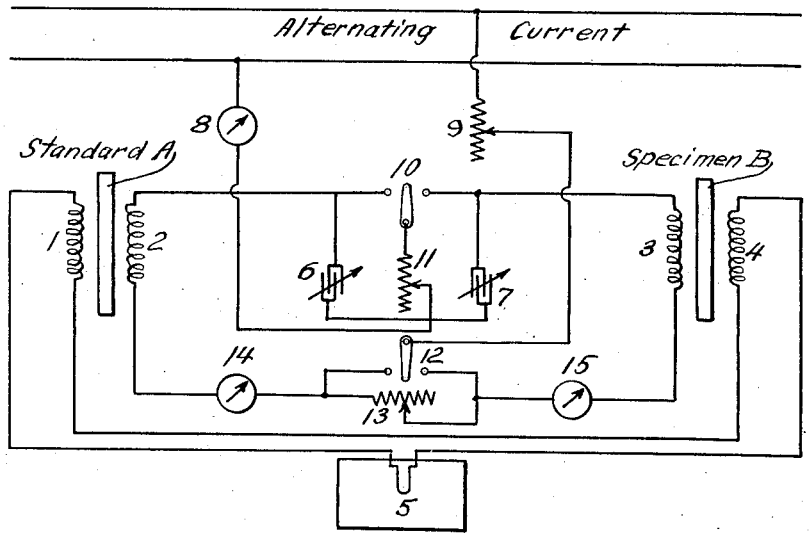
Theodor Zuschlag
INVENTOR Patented Dec. 14, 1937

2,102,450

UNITED STATES PATENT OFFICE 2,102,450

MAGNETIC ANALYSIS

Theodor Zuschlag, Englewood, N. J., assignor to Magnetic Analysis Corporation, Long Island City, N. Y., a corporation of New York Application November 1, 1933, Serial No. 696,220

11 Claims. (Cl. 175—183)

This invention relates to magnetic analysis, and has for its object certain improvements in the method of and apparatus for determining the physical and/or metallurgical characteristics of magnetizable specimens. More specifically, the invention contemplates improvements in the art of measuring and recording the effect imposed by magnetizable objects upon flux set up by alternating current.

In magnetic analysis comparative tests are conducted to determine the instantaneous magnetic relationship between a specimen to be tested and a standard of known magnetic properties, as reflected in the magnitude and other characteristics of a secondary current induced in suitable secondary coils by the flux set up in the specimen by appropriate primary coils, all constants being equal except the magnetic properties of the standard and the specimen. In case the magnetizing current is periodic, each cycle produces a corresponding cycle of induced current in the secondary coils of the testing apparatus, and when the secondary coils are arranged in series opposition, the induced differential current will have certain characteristics depending on variations of the specimen from the standard with respect to their magnetic properties.

In making a magnetic analysis of this kind a pair of separate primary resistance coils is provided. Both primary coils are energized by a common alternating current source. A secondary coil is disposed in inductive relationship to each of the primary coils, as by placing the secondary coil within the primary coil in coaxial alignment therewith. The two secondary coils are connected in series in such a manner that opposed electromotive forces are induced in them by the flow of current in the primary circuit. The standard is placed within one primary coil, and the specimen is placed inside the other primary coil. Thus both specimen and standard are simultaneously subjected to a magnetizing force. If the magnetic properties of the standard and the specimen are the same, the lines of force set up around each are equal in all respects, and there is no resultant measurable effect in the secondary coils. If, however, there is a difference in the magnetic properties of the specimen and the standard, differential secondary currents are induced in the secondary coil circuit. With the aid of suitable means, such as an oscillograph, the instantaneous values of the differential secondary current may be measured and recorded. A reproduction of successive instantaneous values serves to indicate the character and extent of the variation in magnetic properties between the standard and th. specimen. United States Patent No. 1,813,746 to Kinsley describes a method and apparatus by which the fluctuation of the secondary circuit may be reproduced for visual inspection by means of an oscillograph; and my copending application Serial No. 664,163, filed April 3, 1933, describes other methods and apparatus by which instantaneous values of the secondary current may be determined.

In magnetic testing apparatus of the type described, in addition to the effect of flux variation upon the secondary circuit, there is also an effect of flux variation in the primary circuit. In the heretofore customary art of magnetic analysis this effect of flux variation upon the primary circuit has not been utilized for analytical purposes. The present invention contemplates the utilization of this effect in conjunction with the effect upon the secondary circuit as well as with another effect about to be described, in a manner which permits increased sensitiveness of measurement of magnetic characteristics. The invention also contemplates the attainment of more refined and more accurate data regarding the physical properties of the specimen than has been possible with heretofore existing apparatus.

In order that the invention may be better understood, the principles underlying its practice will be briefly discussed. When an alternating current is passed through a primary coil of an apparatus for magnetic analysis of the type above described, an inductive reactance is set up. This inductive reactance has the effect of changing the effective resistance of the coil. A change in the magnetic characteristics of a magnetizable body placed in inductive relationship to the coil will change the inductive reactance, and hence the effective resistance, of the primary coil. In the case of a coil that has a relatively low ohmic resistance, the addition of inductive reactance may result in an effective resistance that is much greater than the original ohmic resistance. But the change in inductive reactance due to a change in magnetic properties of the associated magnetizable body is relatively small in proportion to the effective resistance, and therefore the change in current in the primary circuit due to the substitution of a body of different magnetic characteristics in the field will be small in proportion to the total current flow. In other words, the ratio of the change in current due to the change of effective resistance to the total current is very small. In the heretofore customary practice of magnetic analysis, the magnitude of this variation with respect to the total primary current flow has been too minute to have any appreciable effect upon the induced current in the secondary coil, and hence it has not been utilized for magnetic analysis.

If, however, a condenser is placed in the circuit with the primary coil, the capacitance tends to oppose the inductance. Since the effective resistance of such a circuit is the vector summation of ohmic resistance, reactive inductance, and capacitive inductance, it will tend to decrease and approach ohmic resistance as the capacitive inductance increases to the value of the reactive inductance. Such an effect may be accomplished by tuning the condenser into resonance with the coil. When this balanced condition is attained, any change in inducive reactance due to a variation in flux will be larger in proportion to the effective resistance than it would be if the capacitive inductance were not offset against the reactive inductance. Consequently the ratio of primary current change due to a variation in flux induced by substitution of a specimen of different magnetic characteristics to the total current will be relatively great. The effect of a change of flux upon the current in the primary circuit is thus magnified, and becomes great enough to induce an appreciable variation of current in the secondary coils. This invention contemplates the application of this principle to increase the sensitivity of apparatus for magnetic analysis by associating condensers in the circuits with the primary coils.

In one preferred form of the apparatus an additional principle is utilized to increase the sensitiveness of the device. When two induction coils are placed in parallel, and receive alternating current from a common source, an increase in the effective resistance of one coil decreases the current in that coil and increases the current in the other. It will be apparent that the total difference in current flow between the two legs of such a parallel circuit will be greater than if the two coils were connected to each other in series. Since the sensitivity and accuracy of apparatus of the type under discussion are increased when the current variation is increased, the parallel arrangement of the primary coils is preferable.

A further understanding of the invention may be obtained by referring to the accompanying drawings, in which:

Fig. 1 is a diagrammatic representation of the circuits in a magnetic analysis apparatus in which the primary coils are connected in series, as in the prior art.

Fig. 2 is a diagram of the circuits in a magnetic analysis apparatus according to the prior art in which the primary coils are connected in parallel.

Fig. 3 is a simplified wiring diagram of one of the preferred forms of magnetic analysis apparatus of this invention in which the primary coils are connected in parallel.

Fig. 4 is a diagrammatic representation in simplified form of another modification of an apparatus of this invention.

Fig. 5 is a diagrammatic representation of magnetic testing apparatus in one preferred form of the invention, and Fig. 6 is a diagram of a further modification of a magnetic analysis apparatus according to the present invention.

In Fig. 1 is represented the electrical circuits of an apparatus for magnetic analysis according to the prior art. The primary coils 2 and 3 of the apparatus are connected in series to an alternating power source. The secondary coils 1 and 4 are connected in series opposition with a suitable meter 5, which indicates instantaneous values of the induced differential current resulting from the positioning of objects A and B of unlike magnetic properties in the fields of coils 2 and 3. Since the primary coils are connected in series, the current which flows through both will be the same, and a change in the effective resistance of one primary coil will change the current flowing through both coils by the same amount.

Fig. 2 is a diagram of the circuits of another magnetic analysis apparatus according to the prior art, in which primary coils 2 and 3 are connected in parallel with a common alternating current source instead of in series as in Fig. 1. Otherwise the apparatus is similar to that of Fig. 1. However, since the primary coils in this arrangement are connected in parallel, an increase in the effective resistance of primary coil 2 due to a change of the magnetic properties of a body within its field, will cause a decrease in the amount of current which flows through coil 2 and an increase in the amount of current which flows through coil 3. This increased difference in current will be reflected in the induced current of the secondary circuit, but since the difference in the primary circuit is a small proportion of the total current in this circuit, the increased variation of induced differential current in the secondary circuit will be small. In the heretofore customary practice the increased variation in current due to the arrangement of the primary coils has been too small in proportion to the total current to affect the sensitivity of the apparatus to an appreciable degree.

It will now be apparent that the reason for the lack of effect of the variation in the effective resistance of the primary circuit upon the sensitivity of the apparatus used in the prior art is attributable to the fact that the total effective resistance, which is the vector summation of the relatively small ohmic resistance of the conductor itself and the relatively large inductive reactance, is much greater than any variation of inductive reactance due to a change of the magnetic properties of the specimens in the fields of the primary coils. This condition is greatly changed in an apparatus constructed in accordance with the diagrammatic representation of the magnetic analysis circuit shown in Fig. 3 which involves a practice of my invention. In this arrangement the two primary coils 2 and 3 are connected in series with each other in the manner of Fig. 1, but primary coil 2 is paralleled by an adjustable condenser 6; and, similarly, primary coil 3 is in parallel with the adjustable condenser 7. The secondary circuit 1, 4, 5 is similar to those shown in Figs. 1 and 2. In the operation of the apparatus of Fig. 3 the condensers are tuned into resonance with a harmonic of the alternating current source, which in effect produces a cancellation of the inductive reactance of the primary coils by the capacitive reactance of the condensers. As a result the effective resistance of the circuit is reduced to an approximation of the true ohmic resistance. Then, if the inductive reactance is changed by introducing specimens of unlike magnetic properties into the fields of the primary coils, the change in current which results will be a large proportion of the total current, provided that the ohmic resistance of the circuit is small. The greater ratio of change of current to total current in the primary circuit will be reflected by a greater variation of the instantaneous values of the differential current induced in the secondary circuit, which in turn will result in greater accuracy of the means 5 chosen to measure the variation.

A second arrangement of a testing circuit according to my invention, in which condensers are employed to neutralize the initial inductive reactances of the primary coils, is shown in Fig. 4, in which the primary coils 2 and 3 are in parallel across an alternating current source, in the manner of Fig. 2, and the apparatus is otherwise similar in all respects except that each primary coil 2 and 3 is connected in series with a variable condenser 6, 7. Tuning is accomplished in the same manner as the apparatus of Fig. 3. It will be apparent that the arrangement shown in Fig. 4 will be more sensitive than that shown in Fig. 3, for the reason that the parallel circuit of primary coils produces of and by itself a greater variation of current when the flux around one primary coil is changed.

Referring now to Fig. 5, in which a modified electrical circuit of the magnetic analysis apparatus of this invention, corresponding in principle to Fig. 3, is shown, two identical primary, or energizing, coils 2 and 3 are connected in series with two ammeters 14 and 15 and a variable resistance 13 across an alternating current source. The two primary coils preferably consist of a suitable number of turns of insulated copper wire of relatively large cross section in order to have low ohmic resistances in the coils. A variable condenser 6 may be shunted with primary coil 2 by closing switch 12 to the left; and, similarly, a variable condenser 7 may be shunted into the circuit with primary coil 3 by moving switch 12 to the right. Common ends of the two condensers 6 and 7 are connected to a variable resistance 11, and through the resistance to the contact arm of a single pole, double throw switch 10, by means of which the resistance 11 may be shunted across either of the two condensers 6 and 7. The single pole double throw switch 12 may be used to connect either of the two primary coils in series with a variable resistance 9. The alternating current supply from the line is measured by means of ammeter 8 which is connected in series. Current supply may be regulated by means of the variable resistance 9 which is also in series with the primary coil circuits, since it is connected to the contact points of the switch 10. The secondary circuit of this apparatus 1, 4, 5 is identical with those of the arrangements previously described. Secondary coils 1 and 4 are substantially identical, and preferably constructed of insulated wire of low ohmic resistance. These are placed in inductive relationship to primary coils 2 and 3 and connected in series opposition with indicator 5, which is adapted to record instantaneous values of the induced differential current.

In conducting a magnetic analysis with the apparatus of Fig. 5, one of a pair of substantially identical standards (A and A) of substantially identical magnetic properties is inserted in the field of primary coils 2 and 3. Switch 12 is closed to either side and the condensers 6 and 7 are adjusted in order to produce approximate resonance with respect to a harmonic of the exciter current. The tuned condition may easily be recognized by means of ammeters 14 and 15. When this condition is attained any deflection of the indicator 5 is reduced to a minimum value by a suitable adjustment of switch 12, resistance 13, switch 10 and resistance 11. By this manipulation the induced secondary currents in coils 1 and 4 are made approximately equal, and hence there is no substantial resultant differential current to be recorded. When balance has been obtained in this manner, one of the standards A and A is extracted and replaced by a specimen B whose magnetic characteristics are unknown, but whose physical dimensions preferably correspond to those of the standards. If the unknown specimen possesses the same magnetic characteristics as the standard for which it was substituted, the resultant current value variation recorded by indicator 5 will remain unchanged. If, however, the magnetic properties of the unknown specimen are different from those of the standard, a differential current will be induced in the secondary circuit, and the instantaneous values which are reproduced by the indicator will serve as a basis for the determination of the unknown magnetic, physical and/or metallurgical properties of the specimen under examination.

Fig. 6 shows a further modification of magnetic analysis apparatus constructed in accordance with my invention, and corresponds in principle to the arrangement shown in Fig. 4. It differs from that of Fig. 5 in that primary coils 2 and 3 are in parallel with the alternating current source, each primary coil being connected in series with a variable condenser 6 and 7. In other respects the apparatus of Figs. 5 and 6 correspond.

The operation of this apparatus is substantially the same as in the case of that of Fig. 5. Substantially identical standards are inserted in each primary coil. The switch 12 is closed to either side and the condensers are tuned to a harmonic of the exciter current. The indicator 6 is brought to a minimum position by appropriate adjustment of the switch 12, resistance 13, switch 10 and resistance 11. One of the standards is then replaced by the specimen to be tested and the readings of indicator 5 serve as a criterion for the determination of the difference in magnetic, physical and/or metallurgical properties between specimen and standard.

As has been stated, the apparatus of Fig. 6 corresponds in principle to the explanatory diagram in Fig. 4 and in effect the two primary coils may be considered to be in parallel with each other. For this reason the differential of the current in the primary circuit due to a change in flux will be greater than in the case when the two primary coils are in series. As a result the induced differential current in the secondary circuit will be greater than in the case of the apparatus illustrated by Fig. 5, and the apparatus of Fig. 6 is correspondingly more sensitive.

A further advantage of the apparatus of this invention, as illustrated in Figs. 3, 4, 5 and 6, lies in the fact that the tuning of the primary coil circuits tends to eliminate higher harmonics which affected readings in the heretofore customary practice without increasing the amount of useful information, but on the contrary tended to complicate the interpretation of results. By the suppression of higher harmonics in the present invention the character of the reproductions of instantaneous value variations in induced currents is simplified, and the results may be more conveniently interpreted.

It is obvious that by employing suitable amplifying devices the magnitude of deflections in the measuring apparatus may be increased still further, but mere amplification will not serve to increase inherent sensitivity because inaccuracies will be increased in the same proportions as true quantities. The present invention allows the recording of amplified readings, but at the same time the means employed are capable of producing more accurate representations of the true flux variations in the specimens. For this reason, it is not possible to duplicate the result of tests conducted with the apparatus of the present invention by merely amplifying the readings of apparatus, as in the prior art.

It should be remarked that the presence of unlaminated iron specimens within the test coils of the apparatus generally tends to reduce the efficiency of the tuning operation. Notwithstanding, by using suitable coils and condensers satisfactory tuning effects are always obtainable.

Practical experiments conducted with the apparatus of Figs. 5 and 6 have demonstrated the efficacy of condensers in emphasizing the effect of flux variations upon the magnitude and accuracy of the readings of the indicator. Certain refinements of the apparatus may occur to one skilled in the art of magnetic analysis without however, departing from the fundamental concepts of the invention.

I claim:

1. A method of testing a magnetizable body which comprises, simultaneously establishing a magnetic flux in a standard of known magnetism affecting properties and in said body respectively by means of alternating current exciter coils placed in inductive relationship to said standard and said body respectively, emphasizing the difference in the two fluxes set up by tuning the exciter coils to a harmonic of the exciter current, and producing for inspection a representation of the instantaneous value variations of a cycle unit of a secondary current produced by the emphasized difference in said magnetic fluxes due to a difference in a magnetism affecting property of said standard and said body.

2. A method of testing a magnetizable body which comprises, simultaneously establishing a flux in a standard of known magnetism affecting properties and in said body respectively by means of exciter coils placed in inductive relationship with said standard and said body respectively, emphasizing the character and magnitude of the difference in the two fluxes by tuning the exciter coils to a harmonic of the exciter current, and producing for inspection a continuous representation of the instantaneous value variations of a cycle unit of a secondary current produced by the emphasized difference in said magnetic fluxes.

3. A method of testing a magnetizable body which comprises, simultaneously establishing a magnetic flux in a standard of known magnetism affecting properties and in said body respectively by means of alternating current exciter coils, emphasizing the character and magnitude of the difference in the two magnetic fluxes by neutralizing the intial inductive reactances of said exciter coils by means of capacitive inductance, and producing for inspection a representation of the instantaneous value variations of a cycle unit of a secondary current produced by the emphasized difference in said magnetic fluxes.

4. A method of testing a magnetizable body which comprises, simultaneously establishing a magnetic flux in a standard of known magnetism affecting properties and in said body respectively by means of alternating current exciter coils of a primary circuit, emphasizing the character and magnitude of the difference in the two fluxes by reducing the efective resistance of the primary circuit, and producing for inspection a representation of instantaneous value variations in successive cycles of a differential current produced by a difference in said magnetic fluxes due to a difference in a magnetism affecting property of said standard and said body.

5. The method of testing a magnetizable body which comprises, simultaneously establishing a magnetic flux in two standards of substantially identical magnetism affecting properties by means of exciter coils connected to an alternating current source, tuning said exciter coils to a harmonic of the alternating current, replacing one of said standards by the magnetizable body to be tested, and producing for inspection a representation of the instantaneous value variations of a cycle unit of a secondary current produced by difference in said magnetic fluxes due to a difference in a magnetism affecting property of said body and said standards.

6. The method of testing a magnetizable specimen which comprises, simultaneously establishing a magnetic flux in two substantially identical standards by means of exciter coils connected to an alternating current source, tuning said exciter coils to a harmonic of the alternating current by means of variable condensers associated with them, equalizing said fluxes by adjusting appropriate variable resistances, replacing one of said standards by the specimen to be tested, and producing for inspection a representation of the instantaneous value variations of a secondary current produced by differences in said magnetic fluxes due to a difference in a magnetism affecting property of said body.

7. In apparatus for testing a magnetizable body the combination of a primary circuit comprising a pair of substantially identical energizing coils of relatively low ohmic resistance connected in parallel and adapted to be energized by an alternating current, a variable condenser in series with each energizing coil, and a secondary circuit comprising two identical secondary coils connected in series opposition with an indicator capable of recording instantaneous value variations of the current induced in the secondary circuit due to the insertion of bodies of unlike magnetic properties in the fields of the energizing coils.

8. In apparatus for testing a magnetizable body the combination of a primary circuit comprising, a pair of identical energizing coils of relatively low ohmic resistance connected in series with an alternating current source, a variable condenser in parallel with each energizing coil, and a secondary circuit comprising two coils connected in series opposition with an indicator adapted to record instantaneous value variations of current induced in the secondary circuit due to the insertion of specimens of unlike magnetic properties in the fields of the primary coils.

9. Magnetic testing apparatus comprising a primary circuit in which a pair of substantially identical primary coils are each connected in series with a variable condenser and in parallel with each other, and a secondary circuit in which two substantially identical secondary coils are disposed respectively in inductive relationship with said primary coils, said secondary circuit being provided with current indicating means.

10. Magnetic testing apparatus comprising a primary circuit in which a pair of substantially identical primary coils are each connected in parallel with a variable condenser and in series with each other and an alternating current source, and a secondary circuit in which two substantially identical secondary coils are disposed respectively in inductive relationship with said primary coils, said secondary circuit being provided with a current indicating device.

11. In magnetic analysis apparatus the combination comprising a primary circuit having two primary coils each of which is connected to a variable condenser and adapted to be energized by an alternating current source, and a secondary circuit having two secondary coils connected in series opposition and disposed in inductive relationship respectively with the primary coils, said secondary circuit being provided with a current indicating device.

THEODOR ZUSCHLAG.